United States Patent [19]

Baughman et al.

[11] 4,255,535
[45] Mar. 10, 1981

[54] ORGANIC POLYMERS WITH NEAR-ZERO UNIAXIAL THERMAL EXPANSION COEFFICIENTS

[75] Inventors: Ray H. Baughman, Morris Plains; Edith A. Turi, Livingston; Anthony F. Preziosi, Ledgewood; Kwok-Chun Yee, Randolph, all of N.J.

[73] Assignee: Allied Chemical Corporation, Morris Township, Morris County, N.J.

[21] Appl. No.: 970,093

[22] Filed: Dec. 15, 1978

Related U.S. Application Data

[60] Continuation-in-part of Ser. No. 704,856, Jul. 13, 1976, abandoned, which is a division of Ser. No. 537,488, Dec. 30, 1974, Pat. No. 3,994,867.

[51] Int. Cl.$^3$ ............................................. C08G 18/62
[52] U.S. Cl. .................................. 525/129; 264/289.3; 260/42.18; 260/42.22
[58] Field of Search ....................... 526/285; 528/481; 260/900, 858, 42.22, 42.18; 428/421; 264/289; 525/129

[56] References Cited

U.S. PATENT DOCUMENTS

| | | | |
|---|---|---|---|
| 1,963,074 | 6/1934 | Carothers et al. | 526/285 |
| 2,741,625 | 6/1956 | Carpenter et al. | 526/285 |
| 3,313,787 | 4/1967 | Valvassori | 526/285 |
| 3,852,235 | 12/1974 | Krutchen | 260/32.4 |
| 3,923,622 | 12/1975 | Baughman et al. | 204/159.22 |
| 3,926,897 | 12/1975 | Cessna | 526/285 |
| 3,994,867 | 11/1976 | Baughman et al. | 526/304 |

FOREIGN PATENT DOCUMENTS

1940691 2/1971 Fed. Rep. of Germany .
971170 3/1961 United Kingdom .

OTHER PUBLICATIONS

Journal of Polymer Science–12, 2467–2475 (1975).
Z. Naturforsch, b 24 (1969) 824, G. Wegner.
Whisker Technology–306–342 (1971)–A. Levitt.
Agnew Chem., 83, Nr. 7, 253 (1971)–Hadicke et al.
J. of Research Nat'l. Bur. Standards, 53, No. 4, 245 (1954).
Polymer, 14 (8), 433–439 (1973), Kiji et al.
Die Makromole Kulare Chemie, 154 (1972), 35–48, CA 83, 60939m (1975).

*Primary Examiner*—V. P. Hoke
*Attorney, Agent, or Firm*—Robert A. Harman

[57] ABSTRACT

There are provided composites having near-zero uniaxial thermal expansion coefficients. One or more polyacetylenes having a negative uniaxial thermal expansion coefficient are uniaxially or biaxially oriented within one or more solid matrix materials having a positive thermal expansion coefficient to yield a composite material having a uniaxial thermal expansion coefficient which is nearly zero. The polyacetylenes are obtained by the solid-state polymerization of crystals of monomers containing at least one —C≡C—C≡C— grouping per molecule. Also provided are processes for producing the above-described composites.

2 Claims, No Drawings

ORGANIC POLYMERS WITH NEAR-ZERO UNIAXIAL THERMAL EXPANSION COEFFICIENTS

CROSS REFERENCES

This application is a continuation-in-part of copending U.S. Application Ser. No. 704,856, now abandoned, filed July 13, 1976, which is a divisional application of U.S. Application Ser. No. 537,488, filed Dec. 30, 1974, now U.S. Pat. No. 3,994,867, issued Nov. 30, 1976.

BACKGROUND OF THE INVENTION

1. Field of the Invention

This invention relates to the preparation of composite organic polymeric materials with near-zero uniaxial thermal expansion coefficients and their preparation.

2. Description of the Prior Art

Materials with near-zero thermal expansion coefficients are required for use in optical applications and in other areas of technology wherein high dimensional stability over a specified temperature range is necessary.

Conventional materials which have low linear thermal expansion coefficients ($\alpha$), such as metallic alloys and inorganic glasses, have been employed previously. However, metallic alloys such as Invar, which comprises about 64 weight percent iron and 36 weight percent nickel (average $\alpha$ equal to about $2 \times 10^{-6}$ °C.$^{-1}$ between zero and 100° C.), and Superinvar, which comprises from about 62.5 to 64.0 weight percent iron, 30.5 to 34.0 weight percent nickel and 3.5 to 6.0 weight percent cobalt ($\alpha = 0$ to $0.5 \times 10^{-6}$ °C.$^{-1}$ at 20° C.), are both expensive and extremely heavy. In addition, these alloys are difficult to machine. Moreover glasses such as vitreous SiO$_2$ ($\alpha = -0.27 \times 10^{-6}$ °C.$^{-1}$ at 160° C.; $0.1 \times 10^{-6}$ °C.$^{-1}$ at $-60°$ C.; $+0.35 \times 10^{-6}$ °C.$^{-1}$ at 0° C. and $+0.50 \times 10^{-6}$ °C.$^{-1}$ at $+60°$ C.) are difficult to machine, heavy and are also very brittle.

Thus, there is a need for a material having high thermal dimensional stability in at least one direction, which is strong, light, easily machined, and inexpensive. Organic polymers are attractive construction materials because of their low densities, low cost, and ease of processing. However, conventional organic polymers do not have high dimensional stability. They creep, i.e., undergo slow and irreversible deformation, under mechanical stress and typically have high thermal expansion coefficients (e.g., linear thermal expansion coefficients of the order of $10^{-4}$ °C.$^{-1}$ for anisotropic linear polymers).

The intrinsic thermal expansion coefficient along the chain direction of a fully crystalline linear polymer, is typically small and negative, while the thermal expansion coefficients along orthogonal directions are generally large and positive. However, organic polymers, as generally produced, are not sufficiently free of regions containing misaligned polymer chains, that is, polymer chains non-parallel with the average chain direction. Thus, the large, positive thermal expansion contribution from such regions overwhelms the much smaller negative chain-direction contribution from highly aligned chains. Consequently, the observed macroscopic thermal expansion coefficient along the average chain direction, that is, the uniaxial thermal expansion coefficient, is positive. While a higher degree of chain alignment can be obtained for some polymers by drawing processes, morphological changes usually occur at relatively low temperatures which result in irreversible dimensional changes. Consequently, these polymers are not suitable for use as structural elements for applications in which high thermal-dimensional stability is required.

SUMMARY OF THE INVENTION

In accordance with the invention, composites having near-zero uniaxial macroscopic thermal expansion coefficients are obtained which are lightweight, have high strength, are creep-resistant, and easily formed or machined. These composites are particularly useful in those areas of application wherein it is desired to substantially eliminate dimensional instability in a structural element.

Accordingly, there is provided a process for preparing a composite having a near-zero uniaxial thermal expansion coefficient comprising uniaxially or biaxially orienting at least one highly chain-aligned polyacetylene, possessing a negative uniaxial thermal expansion coefficient within the matrix of at least one material possessing a positive thermal expansion coefficient, and being a solid at room temperature, wherein said polyacetylene is obtained by solid state polymerization of crystals of an acetylenic monomer, selected from the group of cyclic and acyclic acetylenic monomers containing at least one —C≡C—C≡C— grouping per molecule.

Also provided are composites having a near-zero uniaxial thermal expansion coefficient comprising at least one highly chain-aligned polyacetylene, possessing a negative uniaxial thermal expansion coefficient, being uniaxially or biaxially oriented within a solid matrix material, possessing a positive thermal expansion coefficient, wherein said polyacetylene is obtained by solid state polymerization of crystals of an acetylenic monomer, selected from the group of cyclic and acyclic acetylenic monomers containing at least one —C≡C—C≡C— grouping per molecule.

Highly chain aligned polyacetylenes formed by the solid-state polymerization of crystals of acetylenic monomers containing at least one —C≡C—C≡C— grouping per molecule have a negative uniaxial thermal expansion coefficient over a wide temperature range (from below $-50°$ C. to the thermal degradation or melting temperature, which is usually between 100° and 500° C.). These polymers are lightweight, generally having a density less than 1.4 gm/cm$^3$, have strengths as high as $2.5 \times 10^5$ psi, and are highly resistant to creep, and accordingly are starting materials in the present invention.

DETAILED DESCRIPTION

According to the present invention, composites and a process for their manufacture are provided which have a near-zero uniaxial thermal expansion coefficient ($\alpha$).

The term "thermal expansion coefficient" is herein defined as in that quantity $\alpha$ which in the measurement direction satisfies the relation:

$$\alpha = \frac{\Delta L}{L_o \cdot \Delta T}$$

where $\Delta L$ is the dimensional change from the initial dimension $L_o$ which occurs reversibly upon changing the temperature of the material by $\Delta T$. To define $\alpha$ at a particular temperature T, $\Delta T$ is taken to be vanishingly small.

"Near-zero" thermal expansion coefficients are herein defined: $|\alpha|<1.0\times10^{-6}$ C.$^{-1}$; that is where the absolute value of the observed $\alpha$ is less than about $1.0\times10^{-6}$ C.$^{-1}$.

By the term "uniaxial orientation", as used herein, is meant alignment of the polymer chains such that the chains are predominently aligned in a common direction such as along the axis of a fiber. For purposes of this invention, the polyacetylene polymer chains, possessing a negative thermal expansion coefficient are aligned in parallel with the longitudinal axis of a solid matrix material such as a fiber, thereby resulting in a near-zero thermal expansion coefficient along the longitudinal axis in the resulting composite.

By the term "biaxial orientation", as used herein, is meant the alignment of polyacetylene polymer chains within the solid matrix of said solid material in a common plane. Particularly, the axis of the polyacetylene, possessing the negative thermal expansion coefficient is aligned in parallel with one plane of the solid matrix material, such as in a sheet or film, thus resulting in a near-zero thermal expansion coefficient along directions in that particular plane in the resulting composite. Such uniaxial or biaxial orientation of polyacetylene polymer chains in a solid matrix material can be obtained, for example, by drawing, extruding, rolling, and the like.

Thus, the "orienting" processes are designed to position the polyacetylene in an aligned manner, and not a random manner, along a particular axis or plane in the resulting composite.

The term "uniaxial thermal expansion coefficient" means a thermal expansion coefficient measured in the orientation direction for a uniaxially oriented composite and in a direction within the orientation plane for a biaxially oriented composite.

1. Thermal Processing

Polymers having a negative uniaxial thermal expansion coefficient can be thermally processed for a time and at a temperature sufficient to induce chain misaligned fractions along a particular polymer chain axis, thereby resulting in a polymer having a near-zero uniaxial thermal expansion coefficient. This fractional chain misalignment is introduced either during a first order phase transformation or during chemical degradation. The polymer during such a thermal process is subjected to at least one cycle comprising (a) heating from a first temperature, herein termed the "initial temperature", which is below the temperature at which the polymer undergoes a first order phase transformation or chemically degrades, to a second or thermal processing temperature which is either above the temperature at which this first order phase transformation occurs or above the temperature at which chemical degradation occurs or both (b) holding at the second temperature for a period of time; and (c) cooling to a temperature below the first order phase transition temperature or temperature which substantial degradation occurs.

The first or initial temperature from which the polymer is to be heated may vary widely, being any temperature between room temperature, (i.e., about 20° C.) and either the phase transformation or chemical degradation temperature (typically not higher than about 200° C.)

As used herein, the second or thermal processing temperature is intended to define the maximum temperature desired to be obtained during the thermal processing step and is a temperature at or above the temperature at which a first order phase transformation or chemical degradation occurs. The chemical degradation temperature, as used herein, is the lowest temperature at which chemical degradation is observable in one hour by a conventional technique such as either thermal gravimetric analysis or infra-red spectroscopy. The first order phase transition referred to above may be either a reversible or irreversible phase transformation and includes crystallographic phase changes and melting. The temperature of this phase transition may be easily determined by conventional methods such as calorimetry, optical microscopy, or X-ray diffraction. While the temperature at which such a first order phase transformation occurs will vary widely, generally such a phase transformation occurs at a temperature between 50° and 400° C. and more usually about 100° to 300° C. for organic polymers.

The thermal processing temperature ranges from a value approximately equal to the first order transformation or chemical degradation temperature to about 100° C. above that temperature. The thermal processing temperature, like the initial temperature, will vary widely depending upon the polymer being treated, ranging generally from about 50° to 400° C. and preferably from about 100° to 300° C.

The rate at which the polymer is heated from its initial temperatre to the desired thermal processing temperature is not critical and varies, depending upon the size and crystal perfection of the polymer being treated, the final desired uniaxial thermal expansion coefficient, the temperature range over which the polymer is to be heated and other factors. Generally, however, a rate of heating of about 0.1 to $10^{3°}$ C. per minute is conveniently employed.

The amount of time for which the polymer should be maintained at the desired thermal processing temperature will vary widely, depending upon the size and crystal perfection of the polymer being treated, the final desired uniaxial thermal expansion coefficient, the rate of heating of the polymer to the thermal processing temperature and other factors. Generally, however, the polymer is conveniently maintained at the desired thermal processing temperature for a residence time of from about 0.1 second to five hours.

Following thermal processing of the polymer at the desired temperature for the selected period of time, the polymer is cooled by conventional methods, e.g. air cooling, refrigeration, or quenching in a liquid or gas, to a final temperature, which is a temperature below that temperature at which either the crystallographic phase change or chemical degradation occurs. It is not critical that the final temperature achieved on cooling be identical to the initial temperature from which the polymer was heated during the thermal processing step, and such final temperature will generally range from about $-100°$ C. to room temperature (i.e., about 20° C.). The rate at which the polymer is cooled to the desired final temperature will vary widely, depending upon the size and crystal perfection of the polymer being treated, the final desired uniaxial thermal expansion coefficient, the thermal processing temperature, the difference between the thermal processing temperature, and the final temperature and other factors. Generally, however, this time is conveniently between about 1° to $10^{4°}$ C. per minute.

Upon completion of the foregoing thermal processing cycle, the uniaxial thermal expansion coefficient of the polymer may be determined by conventional methods, as for example by use of TMS-1 thermal mechanical analyzer (manufactured by Perkin-Elmer). If the desired near-zero uniaxial thermal expansion coefficient has not been achieved by the single thermal processing cycle, polymers having reversible crystallographic phase changes or which chemically degrade at the thermal processing temperature may again be thermally processed in like manner at a time and temperature sufficient to induce further misalignment into the polymer matrix. While there is no upper limit on the number of thermal processing cycles which may be employed for such polymers, generally from about 1 to 10 thermal processing cycles are employed. In causing the polymer to undergo more than one thermal processing cycle, it is not critical that the same initial temperature, thermal processing temperature or final temperature be employed in subsequent cycles, so long as the initial and final temperatures in each such cycle are below the temperature at which the crystallographic phase change or chemical degradation occurs and so long as the thermal processing temperature in each cycle is above this phase change or chemical degradation temperature. Likewise, it is not critical that such subsequent cycles employ the same residence time at the selected thermal processing temperature. Neither is it necessary to employ in subsequent cycles the same rates of heating and cooling used in the first thermal processing cycle.

The polymer may be heated by a wide variety of methods, such as by conduction or radiation heating and effected either by any conventional heating device which is provided with the temperature controls to give the precision heating required, or by less commonly used apparatus such as by laser devices.

The heating of the polymer undergoing thermal processing is normally performed under any nonreactive gaseous or liquid environment, such as gaseous nitrogen or helium. In this case the pressure of this environment is not critical, and atmospheric pressure has been found quite satisfactory. However, a reactive liquid or gaseous environment, such as gaseous oxygen or chlorine, can be used to increase the rate at which chain misalignment is introduced by chemical degradation. Then a higher gas pressure will normally correspond to a higher rate of chemical degradation at a particular temperature, so that shorter residence times at the thermal processing temperature are required in order to introduce the required degree of chain misalignment.

For polymers which evidence no first order phase transformations other than melting and do not chemically degrade below the melting point, the thermal processing temperature ranges from approximately the equilibrium melting point of the lowest melting fraction of the polymer to about 50° C. above that temperature. In this case the thermal processing temperature will normally be between 100° and 400° C. Here, the main consideration relating to the thermal processing conditions (temperature, heating and cooling rates, and residence time) is the degree of melting. In order to prevent excessive misalignment, it is necessary that not more than about 20% of the polymer be melted and usually not more than about 5%. In all other respects, the same considerations apply as described earlier.

The polymers having negative uniaxial thermal expansion coefficients which have been found especially useful in the practice of the present invention are highly chain-aligned acetylene polymers (polyacetylenes) obtained by solid-state polymerization of crystals of cyclic or acyclic acetylene monomers containing at least one —C≡C—C≡C— grouping per monomer molecule, and preferably acetylenic monomers having the structure $R_1\text{-}(C\equiv C)_n\text{-}R_2$, where "n" is an integer of at least 2 and preferably from 2 to 4. The particular substituent groups on the polyacetylene is not critical for obtaining a negative or near-zero thermal expansion coefficient, as long as the crystalline monomer is readily polymerizable in the solid state. The $R_1$ and $R_2$ substituents may be polar or non-polar, organic or inorganic. Examples of effective $R_1$ and $R_2$ substituents inpolar groups, especially polar groups containing oxygen, sulfur, nitrogen, and/or phosphorus atoms, such as hydroxyl groups, alkoxyl, carboxyl, or esterified hydroxyl groups, urethane groups (—OCONHR$_3$), urea groups, (—NHCONR$_3$R$_4$) amide groups and/or imide groups, as well as the corresponding sulfur and phosphorus analogs. $R_3$ and $R_4$ include the substituent groups of $R_1$ and $R_2$. Substituents $R_1$, $R_2$ $R_3$ and $R_4$ may also be hydrogen and/or functional groups with 1 to 18 carbon atoms, including hydrocarbon groups. Polyacetylenes which are known include those disclosed in U.S. Pat. No. 3,994,867, German Pat. No. 1,940,691 (issued Feb. 25, 1971 to E. Fisher and G Wegner), by R. H. Baughman and K. C. Yee in Vol 12, *Journal of Polymer Science, Polymer Chemistry Section,* pp. 2467–2475 (1974), and by G. Wegner in Vol. 154, *Die Makromolekulare Chemie,* pp. 35–48 (1972). Especially preferred polymers possessing negative uniaxial linear thermal expansion coefficients are polydiacetylenes obtained by solid-state polymerization of crystals of diacetylene monomers, i.e., compounds having at least one —C≡C—C≡C— grouping per monomer molecule. Examples of solid-state polymerized diacetylenes employed in the practice of the present invention are obtained from monomers selected from the group consisting of those having formula (I):

$$R_1\text{-}(C\equiv C)_n\text{-}R_2, \tag{I}$$

wherein "n" is an integer of at least 2 and where $R_1$ and $R_2$ are independently selected from the group consisting of
(a) $CH_3\text{—}(CH_2)_m\text{—}$
(b) $HO(CH_2)_q\text{—}$
(c) $R_3NHCOO\text{—}(CH_2)_p\text{—}$
wherein "m" is an integer of 0 to 15, "q" is an integer of 1 to 15, "p" is an integer of 1 to 15 and $R_3$ is a member selected from the group consisting of
(i) $C_6H_5(CH_2)_r\text{—}$
(ii) $CH_3(CH_2)_r\text{—}$ and
(iii) $C_{10}H_7(CH_2)_r\text{—}$, where "r" is an integer of 0 to 11.
Examples of the above diacetylene monomers are:

| | |
|---|---|
| (1) | $C_6H_5NHOCOCH_2\text{—}C\equiv C\text{—}C\equiv C\text{—}CH_2OCONHC_6H_5$ |
| | 2,4-Hexadiyn-1,6-diol-bisphenylurethane |
| (2) | $HOCH_2C\equiv C\text{—}C\equiv C\text{—}CH_2OCONHC_6H_5$ |
| | 2,4-Hexadiyn-1,6-diol-monophenyl urethane |
| (3) | $CH_3\text{—}C\equiv C\text{—}C\equiv C\text{—}CH_2\text{—}OCONHC_2H_5$ |
| | 2,4-Hexadiyn-1-ol-ethylurethane |
| (4) | $CH_3CH_2NHOCOCH_2C\equiv C\text{—}C\equiv C\text{—}CH_2OCONHCH_2CH_3$ |

-continued

|      |                                                                                                    |
|------|----------------------------------------------------------------------------------------------------|
|      | 2,4-Hexadiyn-1,6-diol-bisethylurethane                                                             |
| (5)  | $CH_3(CH_2)_3NHOCOCH_2-C\equiv C-C\equiv C-CH_2OCONH(CH_2)_3CH_3$                                  |
|      | 2,4-Hexadiyn-1,6-diol-bisbutylurethane                                                             |
| (6)  | $CH_3(CH_2)_5NHOCOCH_2-C\equiv C-C\equiv C-CH_2OCONH(CH_2)_5CH_3$                                  |
|      | 2,4-Hexadiyn-1,6-diol-bishexylurethane                                                             |
| (7)  | $CH_3(CH_2)_7NHOCOCH_2-C\equiv C-C\equiv C-CH_2OCONH(CH_2)_7CH_3$                                  |
|      | 2,4-Hexadiyn-1,6-diol-bisoctylurethane                                                             |
| (8)  | $CH_3(CH_2)_{11}NHOCOCH_2-C\equiv C-C\equiv C-CH_2OCONH(CH_2)_{11}CH_3$                            |
|      | 2,4-hexadiyn-1,6-diol-bisdodecylurethane                                                           |
| (9)  | $C_{10}H_7NHOCOCH_2-C\equiv C-C\equiv C-CH_2OCONHC_{10}H_7$                                        |
|      | 2,4-Hexadiyn-1,6-diol-bisnaphthylurethane                                                          |
| (10) | $C_6H_5NHOCO(CH_2)_2-C\equiv C-C\equiv C-(CH_2)_2OCONHC_6H_5$                                      |
|      | 3,5-Octadiyn-1,8-diol-bisphenylurethane                                                            |
| (11) | $CH_3NHOCO(CH_2)_4C\equiv C-C\equiv C-(CH_2)_4OCONHCH_3$                                           |
|      | 5,7-Dodecadiyn-1,12-diol-bismethylurethane                                                         |
| (12) | $CH_3CH_2NHOCO(CH_2)_4-C\equiv C-C\equiv C-(CH_2)_4OCNHCH_2CH_3$                                   |
|      | 5,7-Dodecadiyn-1,12-diol-bisethylurethane                                                          |
| (13) | $C_6H_5NHOCO(CH_2)_4-C\equiv C-C\equiv C-(CH_2)_4OCONH-C_6H_5$                                     |
|      | 5,7-Dodecadiyn-1,12-diol-bisphenylurethane                                                         |
| (14) | $CH_3CH_2NHOCO(CH_2)_2-C\equiv C-C\equiv C-(CH_2)_2OCONHCH_2CH_3$                                  |
|      | 3,5-Octadiyn-1,8-diol-bisethylurethane                                                             |
| (15) | $CH_3NHOCO(CH_2)_2-C\equiv C-C\equiv C-(CH_2)_2OCONHCH_3$                                          |
|      | 3,5-Octadiyn-1,8-diol-bismethylurethane                                                            |
| (16) | $C_{10}H_7NHOCO(CH_2)_2-C\equiv C-C\equiv C-(CH_2)_2OCONHC_{10}H_7$                                |
|      | 3,5-Octadiyn-1,8-diol-bisnaphthylurethane                                                          |
| (17) | $CH_3CH_2NHOCO(CH_2)_3-C\equiv C-C\equiv C-(CH_2)_3OCONHCH_2CH_3$                                  |
|      | 4,6-Decadiyn-1,10-diol-bisethylurethane                                                            |
| (18) | $CH_3NHOCO(CH_2)_3-C\equiv C-C\equiv C-(CH_2)_3OCONHCH_3$                                          |
|      | 4,6-Decadiyn-1,10-diol-bismethylurethane                                                           |
| (19) | $C_6H_5NHOCO(CH_2)_3-C\equiv C-C\equiv C-(CH_2)_3OCONHC_6H_5$                                      |
|      | 4,6-Decadiyn-1,10-diol-bisphenylurethane                                                           |
| (20) | $C_{10}H_7NHOCO(CH_2)_3-C\equiv C-C\equiv C-(CH_2)_3OCNHC_{10}H_7$                                 |
|      | 4,6-Decadiyne-1,10-diol-bisnaphthylurethane                                                        |

Examples also exist of acetylenic monomers containing more than one —C≡C—C≡C— group and cyclic monomrs containing one or more —C≡C—C≡C— groups which can be polymerized in the solid-state, via crystals to produce highly chain-aligned polymers. These polymers will have either a negative or a near-zero uniaxial thermal expansion coefficient and are therefore suitable for the present application. For example, the monoclinic triyne R—C≡C—$_3$R where R is —CH$_2$OCONHC$_6$H$_5$, is known to undergo 1,4-addition solid-state reaction to produce a three-dimensionally ordered polymer; see, e.g., J. Kiji et al., Vol. 14, *Polymer*, pp. 433–439 (1973). Similarly, the tetrayne R—(C≡C)$_4$R, where R is —CH$_2$OCONHC$_2$H$_5$, can be thermally polymerized to form a highly chain-aligned 1,4-addition polymer. Likewise, the chain-reinforced polymer derived by the 1,4-addition polymer derived by the 1,4-addition solid-state reactions of the cyclic monomers [(CH$_2$)$_2$—C≡C—C≡C—(CH$_2$)$_2$]$_4$ and

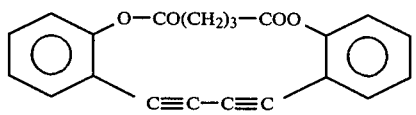

(see, e.g., U.S. Ser. No. 497,027, filed Aug. 13, 1974, now U.S. Pat. No. 3,923,622, issued Dec. 2, 1975, and R. H. Baughman et al., Vol. 12, *Journal of Polymer Science, Polymer Chemistry Section*, pp. 2467–2475 (1974) are satisfactory for the present applications. Because of the backbone-reinforced structures of these polymers, the chain conformational fluctuations which produce a negative thermal expansion coefficient will be damped, so as to result in much smaller magnitude coefficients than observed for non-reinforced structures.

The acetylenic monomers useful in preparing the polyacetylenes which may be employed in the practice of the present invention are obtained by conventional methods. Thus, the monomers of formula (I) may be obtained by reacting the corresponding diyn-mono-ol or diyn-diol with the requisite isocyanate having the formula R$_3$NCO, where R$_3$ is as defined above. See e.g., the methods of preparation disclosed by Wegner, Vol. 24 *Zeitschrift for Naturforschung*, pp. 824–832 (1969).

The acetylenic monomers may be polymerized by conventional solid-state polymerization methods, such as by exposing the monomers to heat, mechanical stress or actinic radiation (e.g., light, ultraviolet radiation or γ-ray radiation).

Chain misalignment of the polyacetylenes is introduced most conveniently by the thermal processing techniques disclosed above. For example, for polyacetylenes for which a reversible first-order crystallographic phase transition exists (such as the monoclinic polydiacetylene which substituent groups —(CH$_2$-)$_4$OCONHC$_2$H$_5$), chain misalignment can be progressively introduced by cycling through this transition. For a polymer (such as the triclinic dioxane-containing phase of the polydiacetylene with substituent groups, —CH$_2$OCONHC$_6$H$_5$) for which a non-reversible first-order phase transition exists, the degree of chain misalignment introduced at this transition can be controlled to an extent by varying the rate of the transition. Alternately, a method of general applicability can be used to introduce structural disorder into the solid-state synthesized polyacetylenes. Because the present polymers have fully conjugated and therefore relatively inflexible backbones, they usually thermally degrade at a temperature below their melting points. This degradation can be used to introduce a small amount of chain misalignment into a polyacetylene, and consequently to substantially decrease the magnitude of the thermal expansion coefficient.

2. Composites

In accordance with the process of the present invention, a polyacetylene having a negative uniaxial thermal expansion coefficient is uniaxially or biaxially oriented within a solid matrix material having a positive thermal expansion coefficient, to provide a composite material having a near-zero uniaxial thermal expansion coefficient. In the practice of the present invention, the polyacetylenes having negative thermal expansion coefficients which may be employed are coextensive with those polyacetylenes discussed previously which may be treated by thermal processing to achieve a near-zero uniaxial thermal expansion coefficient. To be combined with such negative $\alpha$ polyacetylenes are materials being solid and possessing positive $\alpha$. Most glasses, ceramics, metals and organic polymers are known to possess a positive $\alpha$. Preferred materials having a positive $\alpha$ for preparing composites are organic polymers, particularly polyvinylidene fluoride. Of course, one or more polyacetylenes having a negative $\alpha$ may be uniaxially or biaxially oriented into the combined matrix of one or more positive $\alpha$ materials, although the present invention may be practiced successfully employing at least one material possessing each type of expansion behavior.

The composites can be formed by conventional methods, such as by laminating a polymer of negative $\alpha$ to a material of positive $\alpha$ in an alternating fashion along a particular axis. Similarly, a composite can be formed by incorporating an acetylenic monomer into the solid positive expanding matrix and exposing the resulting monomer-containing matrix to heat, mechanical stress or actinic radiation to polymerize the monomer followed by drawing or extruding the sample. Thus, there is provided a composite comprising a positive expanding matrix in which is contained the desired quantity of aligned polyacetylene crystals having a negative $\alpha$ along a particular axis in an amount sufficient to provide a composite having a near-zero uniaxial thermal expansion coefficient along that particular axis. Likewise, a negative $\alpha$ material can be incorporated into the matrix of a positive $\alpha$ polymer, such as by incorporating the negative $\alpha$ material into a melt of the desired positive material, and then aligning the negative material therein, by drawing or extrusion techniques for example, resulting in a solid composite having a material with negative expansion coefficient aligned there in along a particular axis.

In the foregoing methods of forming a composite, if the overall observed uniaxial thermal coefficient of the composite is negative and not sufficiently low, then the composite may be treated by a thermal process, such as disclosed above, so as to introduce misalignment into the highly aligned negative $\alpha$ polymer fraction, thereby resulting in a decrease of the observed uniaxial thermal expansion coefficient to provide the near-zero $\alpha$ desired for the composite. Methods for obtaining the required alignment of a polyacetylene phase or phases, or of the precursor monomer phase or phases, in the solid positive expanding matrix, in a uniaxial or biaxial orientation include extrusion or drawing, use of carrier fluids, use of magnetic or electrostatic fields, paper-making methods (use of screens), textile methods (such as spinning, combing, carding), use of vibration, use of rolling, and fabrication methods by hand. See e.g., *Whisker Technology* (A. P. Levitt, Editor, Wiley-Interscience N.Y., 1970) pp. 306–342, and the references given therein, hereby incorporated by reference.

Obvious variations of the foregoing techniques may be employed, such as by providing a composite material having positive and negative expansion coefficient materials bonded to each other in series in the structural utilization direction by known bonding techniques.

For the latter case where either the dimension of the bonded region is very small compared with the length of both materials or the bonded region is strain-free, the overall expansion coefficient of the composite is given by the equation $\alpha=(\alpha_1 L_1+\alpha_2 L_2)/(L_1+L_2)$, where $L_1$ and $L_2$ are the total lengths of each material in the direction in which the respective thermal expansion coefficients are $\alpha_1$ and $\alpha_2$. Consequently, the $\alpha$ of the composite material can be made near-zero at a given temperature $t_o$ by choosing the ratio of $L_1$ to $L_2$ so that it satisfies the relation $$L_1/L_2 = -\alpha_2(t_o)/\alpha_1(t_o)$$

The coefficient $\alpha$ of the composite will remain near-zero for those temperatures in the vicinity of $t_o$ for which $\alpha_2(t)/\alpha_1(t)$ is nearly equal to $\alpha_2(t_o)/\alpha_1(t_o)$. If both $\alpha_1$ and $\alpha_2$ are given in the temperature region of interest by $\alpha_i = a_i + b_i t$ (where $i=1$ or 2), then the region about which $\alpha$ will remain close to zero is increased by choosing the negative $\alpha$ polymer and the positive $\alpha$ material such that either both $b_1$ and $b_2$ are less than about $10^{-6}$ °C.$^{-2}$, and preferably less than about $5 \times 10^{-7}$ °C.$^{-2}$ or such that the ratio $a_1/b_1$ approximately equals the ratio $a_2/b_2$.

In some instances, the as-polymerized polydiacetylenes include mobile structural defects which must be eliminated by annealing in order to obtain reversible thermal dimensional behavior. Otherwise, the thermal expansion coefficient cannot be properly determined. Accordingly, a low temperature (less than about 100° C.) annealing performed for a period of time less than about 1 hr. is satisfactory.

Accordingly, also a subject of instant invention is a composite having a near-zero uniaxial thermal expansion coefficient comprising at least one highly chain-aligned polyacetylene, possessing a negative uniaxial thermal expansion coefficient, being uniaxially or biaxially oriented within a solid matrix material possessing a positive thermal expansion coefficient, wherein said polyacetylene is obtained by solid state polymerization of crystals of an acetylenic monomer, selected from the group of cyclic and acyclic acetylenic monomers containing at least one —C≡C—C≡C— grouping per molecule.

Preferred composites are wherein said acetylenic monomer has the structure $R_1$—(C≡C)$_n$$R_2$, where "n" is an integer of at least 2 and $R_1$ and $R_2$ are selected from the group consisting of (a) $CH_3$—$(CH_2)_m$—
(b) $HO(CH_2)_q$—
(c) $R_3 NHOCO(CH_2)_p$— where "m" is an integer of 0 to 15, "q" is an integer of 1 to 15, "p" is an integer of 1 to 15 and $R_3$ is a member selected from the group consisting of (i) $C_6H_5(CH_2)_r$—
(ii) $CH_3(CH_2)_r$— and
(iii) $C_{10}H_7(CH_2)_r$— wherein "r" is an integer of 0 to 11.

Particularly preferred composites are wherein n is 2–4.

Also preferred composites are in which said polyacetylene, having a negative uniaxial thermal expansion coefficient given by the expression $\alpha_1 = a_1 + b_1 t$ and said material having a positive thermal expansion coefficient, given by the expression $\alpha_2 = a_2 + b_2 t$, are selected such that the ratio $a_1/b_1$ approximately equals the ratio $a_2/b_2$, where "a" and "b" are constants and "t" is temperature in °C.

Further preferred composites are in which said polyacetylene having a negative uniaxial thermal expansion coefficient, given by the expression: $\alpha_1 = a_1 + b_1 t$, and said material having a positive thermal expansion coefficient given by the expression; $\alpha_2 = a_2 + b_2 t$, are selected such that $b_1$ and $b_2$ are independently constant values less than about $10^{-6}$° C.$^{-2}$, where "a" and "b" are constants and "t" is temperature in °C.

Particularly preferred composites are wherein said solid matrix material having a positive thermal expansion coefficient, is an organic polymer.

The present invention may be further illustrated by reference to the following examples:

EXAMPLES

Examples illustrative of preparing a solid-state polymerized acetylenic monomer having a negative uniaxial thermal expansion coefficient are as follows:

1. As described by G. Wegner in Vol 24b, *Zeitschrift fur Naturforschung*, pp. 824–832 (1969), the monomer 2,4-hexadiyn-1-6-diol-bisphenylurethane is prepared by the reaction of phenylisocyanate with 2,4-hexadiyn-1,6-diol. This monomer is crystallized in the form of fiber-like crystals approximately 5.0 cm long, using as solvent a 1:1 dioxane-water mixture and employing the growth conditions as described below in Example 4. To avoid fracture of the brittle monomer crystals during their removal from the vessel in which they were grown, they are first irradiated with ultraviolet light (100 watt high-pressure mercury lamp). This irradiation is terminated at this stage when the crystals become copper-colored, indicating high conversion to polymer. The increase in strength and degree of flexibility, which result from this treatment, allow removal of the partially polymerized crystals without substantial damage. Polymerization is completed by irradiation with more penetrating radiation as follows. The partially polymerized crystals are irradiated in air at room temperature with $Co_{60} \alpha$-rays at 1 Mrad/hr to obtain total dosages of 15 and 100 Mrad. X-ray diffraction measurements indicate that these polymer crystals are the triclinic modification (Hadicke, et al., Vol. 83, *Angewandte Chemie*, pp. 253–254 1 (1971), which contains ½ molecule of interstitial dioxane per monomer unit. The thermal expansion coefficient in the chain direction for these polymer fibers is negative over the entire measurement range from $-50°$ C. to $100°$ C. and is given by $\alpha = a + bt$, where $a = -(1.686 \pm 0.039) \times 10^{-5}$° C.$^{-1}$, $b = -(1.35 \pm 0.18) \times 10^{-7}$° C.$^{-2}$, and "t" is the temperature in °C. The average thermal expansion coefficient in this temperature range is $-2.0 \times 10^{-5}$° C.$^{-1}$, the same result being obtained independently of whether the 15 or the 100 Mrad samples are considered. Also relevant to the utility of these fibers in forming composites of high dimensional stability is the fact that ultimate strengths as high as $2.5 \times 10^5$ psi are obtained for individual fibers. The static elastic modulus is high $(6.1 \pm 0.6) \times 10^6$ psi, and no measurable plastic deformation occurs until the high stress levels required for fracture are reached.

2. The monomer 4,6-decadiyn-1, 10-diol bisphenylurethane (prepared by the reaction of 4,6-decadiyn-1, 10-diol with phenylisocyanate) is crystallized from an acetone/water solution as approximately 4 to 5 cm long colorless needles, by the procedure described below in Example 4. These crystals are polymerized to high yield by $^{60}$Co $\alpha$-rays at a dose rate of 1 Mrad/hr to obtain a total dosage of 123 Mrad. After solvent extraction of residual monomer, the polymer needles are metallic in appearance and highly dichroic with axis of dichroism parallel to the needle axis, indicating that the polymer chain axis coincides with the needle axis. X-ray diffraction measurements indicated that these needles are monoclinic single crystals in which the polymer chain axis coincides with the unique crystallographic axis. The thermal expansion coefficient measured in the fiber direction is negative over the entire temperature interval from, $-50°$ C. to $100°$ C., with an average value of $-9.3 \times 10^{-6}$° C.$^{-1}$. This polymer has an ultimate strength which exceeds $1.5 \times 10^5$ psi for high perfection fibers and does not measureably plastically deform at stress levels lower than the ultimate strength.

3. The monomer 2,4-hexadiyn-1,6-diol-monophenylurethane is synthesized by the unsymmetrical coupling reaction of propyne-1-ol and 2-propyne-1-ol-phenylurethane and is purified by recrystallization of the crude product from ethyl acetate/petroleum ether. Recrystallization of a 0.4 gm sample from 100 ml of a 10:90 acetone/petroleum ether solvent mixture by slow evaporation at room temperature gives approximately 5 cm long needle-like crystals which turn pink upon exposure to light.

Upon irradiation in air at room temperature with $^{60}$Co $\gamma$-rays at a Mrad/hr for a total dosage of 50 Mrad, these monomer crystals polymerize in 78% yield to provide monocrystalline fibers of poly(2,4-hexadiyn-1,6-diol-monophenylurethane). These highly dichroic crystals are orthorhombic, with the axis of dichroism and the polymer chain axis parallel with the fiber axis. The monomer extracted fibers are heated to $100°$ C. for between 5 and 10 minutes in order to anneal out mobile structural defects in the polymer which otherwise provide irreversible thermal dimensional behavior. The annealed polymer fibers have reversible thermal dimensional behavior in the entire measurement range from $-50°$ to $100°$ C., with a negative thermal expansion. The average thermal expansion coefficient in the fiber direction is $-1.33 \times 10^{-5}$° C.$^{-1}$ between $-50°$ and $+100°$ C. and $-1.19 \times 10^{-5}$° C.$^{-1}$ between $-50°$ and $40°$ C. Ultimate strengths exceeding $2.5 \times 10^5$ psi are obtained for selected fibers of this polymer.

4. The monomer 2,4-hexadiyn-1-ol-ethylurethane is prepared by an addition reaction between 2,4-hexadiyn-1-ol and ethylisocyanate and purified by recrystallization. Needle-like crystals of the monomer are grown from a 0.004 gm/ml solution of the monomer in n-heptane by cooling the solution on a stoppered test tube from $57°$ C. to room temperature at rate of $1.2°$ C./hr. These crystals, which are up to 5 cm long, are polymerized by $^{60}$Co $\gamma$-ray irradiation (15 Mrad at room temperature), and the residual monomer is extracted with acetone. The resulting polymer fibers are highly dichroic, with the axis of dichroism coincident with the fiber direction. X-ray diffraction measurements indicate that these fibers are not three-dimensionally ordered. Although the polymer chains are parallel, the projection of the polymer structure down the chain-axis direction is not periodic. Consequently, the structure of this polymer is analogous to a conventional nematic phase liquid crystal. Nevertheless these crystals do have a negative thermal expansion coefficient in the chain direction over the entire measurement interval from $-50°$ to $+40°$ C., with an average value of $-2.50\times 10^{-5°}$ C.$^{-1}$.

5. The monomer 4,6-decadiyn-1, 10-diol-bisethylurethane is prepared by the reaction of ethyl isocyanate and 4,6-decadiyn-1,10-diol and purified by recrystallization. The monomer is then dissolved in a volume:-volume mixture of acetone and petroleum ether (⅓) to form a 0.00025 gm/ml solution. Using the same crytallization procedure as described in Example 4, needle-like crystals up to 7.5 cm long are grown from this solution. The polymerization method and monomer extraction are as described in Example 4. The resulting polymer fibers have a metallic appearance similar to that of gold. The monomer extracted fibers are heated to 100° C. for between 5 and 10 minutes in order to anneal out structural defects in the polymer which otherwise provide irreversible thermal-dimensional behavior. The annealed polymer fibers have reversible thermal-dimensional behavior in the entire temperature range from $-50°$ C. to 100° C., with a negative thermal expansion. The average thermal expansion coefficient in the fiber direction is $-1.80\times 10^{-5°}$ C.$^{-1}$ between $-50°$ and $+100°$ C. and $-1.88\times 10^{-5°}$ C.$^{-1}$ between $-50°$ and $+40°$ C.

6. The monomer 2,4-hexadiyn-1,6-diol-bisethylurethane is synthesized in 95% yield by the reaction of 11.0 gm (0.10 mole) 2,4-hexadiyn-1,6-diol with 26.5 gm (0.37 mole) ethylisocyanate in the presence of 1,2-dimethoxyethane (50 ml), dibutyltin bis(2-ethylhexanoate (0.1 gm), and triethylamine (2 ml). The monomer is recrystallized as approximately 3 cm long needles by the slow cooling of a 10:90 acetone/petroleum either solution (75 ml) containing 0.2 sample, as described in Example 4. These crystals rapidly turn pink upon exposure to light. Polymerization proceeded quantitatively by $^{60}$Co $\gamma$-ray irradiation at a dose rate of 1 Mrad/hr and a total dosage of 60 Mrad. The resulting polymer fibers are copper-like in appearance and strongly dichroic, with dichroic axis in the fiber axis direction. The polymer fibers are monoclinic monocrystals in which the polymer chain axis, with repeat length 4.9 Å is in a non-unique axis direction. The polymer fibers are annealed as described in Examples 4 and 5, in order to obtain reversible thermal-dimensional behavior. The annealed polymer fiber has a negative thermal expansion coefficient over the entire temperature range from $-50°$ to 100° C. The average thermal expansion coefficient is $-1.46\times 10^{-5°}$ C.$^{-1}$ between $-50°$ and $+100°$ C. and $-1.31\times 10^{-5°}$ C.$^{-1}$ between $-50°$ and $+40°$ C.

7. Crystallization of 1.0 gm of the previously described monomer from a 40:60 water/dioxane solvent mixture (50 ml) by solvent evaporation at room temperature give approximately 3 cm long needles which turn pink upon exposure to light. Upon 50 Mrad irradiation ($^{60}$Co $\gamma$-rays at 1 Mrad/hr), these crystals polymerize quantitatively to produce highly dichroic polymer fibers in which the chain direction and axis of dichroism direction coincide with the needle axis. These fibers have a negative thermal expansion coefficient over the entire temperature range from $-50°$ to 100° C. The average thermal expansion coefficient is $-2.08\times 10^{-5°}$ C.$^{-1}$ between $-50°$ and 100° C. and $-1.94\times 10^{-5°}$ C.$^{-1}$ between $-50°$ and $+40°$ C.

Examples illustrative of polyacetylenes useful for combining with positive $\alpha$ materials through uniaxial or biaxial orienting techniques to form composites having a near-zero thermal expansion coefficient are as follows:

8. For the specific polyvinylidene fluoride polymer investigated by C. E. Weir, Vol. 53, *Journal of Research National Bureau of Standards*, pp. 245-252 (1954), $\alpha_1 = a_1 + b_1 t = 1.01\times 10^{-4°}$ C.$^{-1} + 8.0\times 10^{-7°}$ C.$^{-2} t$ in the temperature range of from 20° to 90° C. The thermal expansion coefficient of the dioxane-containing phase of poly(2,4-hexadiyn-1,6-diol-bisphenylurethane), is given by $\alpha_2 = a_2 + b_2 t = -1.9\times 10^{-5}$ "C" $-1.35\times 10^{-7°}$ C.$^{-2} t$. Since in this case $a_1/b_1 = 1.26\times 10^{-2°}$ C., which is nearly equal to $a_2/b_2 = 1.25\times 10^{-2°}$ "T" the negative thermal expansion coefficient of the polydiacetylene mentioned above can be matched with the thermal expansion coefficient of the positive matrix material over a wide temperature range in which the individual coefficients are well-represented by the $a_i$ and $b_i$ given above. Thus, a composite material can be obtained having a near-zero uniaxial thermal expansion coefficient over this temperature range.

In like manner, the polymers produced in Examples 1 through 7 can be combined with positive $\alpha$ materials including organic polymers possessing positive $\alpha$ characteristics by the processes described herein, thereby resulting in composites having a near-zero uniaxial thermal expansion coefficient. Selection of various organic polymers and polydiacetylenes, and techniques for producing composites therefrom possessing a near-zero uniaxial thermal expansion coefficient, will be obvious to one skilled in the art from this disclosure.

We claim:

1. A process for preparing a composite having a near-zero uniaxial thermal expansion coefficient comprising uniaxially or biaxially orienting at least one highly chain-aligned polyacetylene, possessing a negative uniaxial thermal expansion coefficient, within a solid matrix material possessing a positive thermal expansion coefficient, said chain-aligned polyacetylene having its negative uniaxial thermal expansion coefficient, $\alpha_1$, given by $\alpha_1 = a_1 + b_1 t$ and said matrix material having its positive Thermal expansion coefficient, $\alpha_2$, given by $\alpha_2 = a_2 + b_2 t$; each being selected such that the ratio $a_1/b_1$ approximately equals the ratio $a_2/b_2$; "t" being temperature in °C.; wherein said polyacetylene is obtained by solid state polymerization of crystals of 2,4-hexadiyn-1,6-diol-bisphenylurethane, and said solid matrix material is polyvinylidene fluoride polymer having its positive thermal expansion coefficient given by the expression $\alpha_2 = 1.01\times 10^{-4°}$ C.$^{-1} + 8.0\times 10^{-7°}$ C.$^{-2} t$, where "t" is temperature in °C.

2. A composite having a near-zero uniaxial thermal expansion coefficient comprising at least one highly chain-aligned polyacetylene, possessing a negative uniaxial thermal expansion coefficient, being uniaxially or biaxially oriented within a solid matrix material, possessing a positive thermal expansion coefficient, said chain-aligned polyacetylene having its negative uniaxial thermal expansion coefficient, $\alpha_1$, given by $\alpha_1 = a_1 + b_1 t$ and said matrix material having its positive thermal expansion coefficient, $\alpha_2$, given by $\alpha_2 = a_2 + b_2 t$; each being selected such that the ratio $a_1/b_1$ approximately equals the ratio $a_2/b_2$; "t" being temperature in the region of interest in °C.; wherein said polyacetylene is the solid state polymerization product of crystals of 2,4-hexadiyn-1,6-diol-bisphenylurethane and said solid matrix material is polyvinylidene fluoride polymer having its positive thermal expansion coefficient given by the expression $\alpha_2 = 1.01\times 10^{-4°}$ C.$^{-1} + 8.0\times 10^{-7°}$ C.$^{-2} t$, where "t" is temperature in °C.

* * * * *